United States Patent
Rai et al.

(10) Patent No.: US 9,624,849 B2
(45) Date of Patent: *Apr. 18, 2017

(54) METHOD AND DEVICE FOR CONTROLLING AN INTERNAL COMBUSTION ENGINE

(75) Inventors: Karthik Rai, Stuttgart (DE); Norbert Mueller, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 928 days.

This patent is subject to a terminal disclaimer.

(21) Appl. No.: 13/820,316

(22) PCT Filed: Sep. 8, 2011

(86) PCT No.: PCT/EP2011/065537
§ 371 (c)(1),
(2), (4) Date: May 17, 2013

(87) PCT Pub. No.: WO2012/032110
PCT Pub. Date: Mar. 15, 2012

(65) Prior Publication Data
US 2013/0231849 A1  Sep. 5, 2013

(30) Foreign Application Priority Data

Sep. 10, 2010 (DE) .................. 10 2010 040 559
Sep. 6, 2011 (DE) .................. 10 2011 082 196

(51) Int. Cl.
F02D 41/00 (2006.01)
F02D 41/04 (2006.01)
F02D 41/14 (2006.01)
F02N 11/08 (2006.01)
(Continued)

(52) U.S. Cl.
CPC ....... F02D 41/0002 (2013.01); F02D 41/042 (2013.01); F02D 41/1402 (2013.01);
(Continued)

(58) Field of Classification Search
CPC ........ F02D 13/0242–13/0257; F02D 13/0284; F02D 13/04; F02D 2250/06;
(Continued)

(56) References Cited

U.S. PATENT DOCUMENTS 6,988,031 B2 * 1/2006 McDonald ............. F02D 13/08
123/397
9,206,753 B2 * 12/2015 Calva ..................... F02D 17/02
(Continued)

FOREIGN PATENT DOCUMENTS

CN    1745244 A    3/2006
EP    1 403 512    3/2004
(Continued)

OTHER PUBLICATIONS

International Search Report for PCT/EP2011/065537, dated Oct. 26, 2011.

Primary Examiner — Hung Q Nguyen
Assistant Examiner — Josh Campbell
(74) Attorney, Agent, or Firm — Gerard Messina

(57) ABSTRACT

In a method for stopping an internal combustion engine, a quantity of air supplied to the internal combustion engine via an air-metering device, e.g., a throttle valve, is reduced after a stop request has been determined, and the quantity of air supplied to the internal combustion engine via the air-metering device is increased again when a detected speed of the internal combustion engine falls below a predefinable speed threshold value. The predefinable speed threshold value is increased when, after the metered quantity of air is increased up to stopping of the internal combustion engine, an intake cylinder no longer passes through a bottom dead center.

11 Claims, 8 Drawing Sheets

(51) Int. Cl.
  *F02N 99/00* (2010.01)
  *F02N 19/00* (2010.01)
(52) U.S. Cl.
  CPC ........ *F02N 11/0814* (2013.01); *F02N 99/002* (2013.01); *F02N 99/006* (2013.01); *F02N 2019/008* (2013.01); *F02N 2200/022* (2013.01); *F02N 2200/0801* (2013.01); *Y02T 10/42* (2013.01); *Y02T 10/48* (2013.01)
(58) Field of Classification Search
  CPC .... F02N 19/005; F02N 19/007; F02N 19/008; F02N 11/0818
  See application file for complete search history.

(56) References Cited

U.S. PATENT DOCUMENTS

| | | | | |
|---|---|---|---|---|
| 2005/0279323 | A1* | 12/2005 | Lewis | ................ F01L 13/0005 123/321 |
| 2008/0196095 | A1* | 8/2008 | Sheynblat | .......... G06Q 30/0217 726/9 |
| 2009/0070020 | A1* | 3/2009 | Tetsuno | ................ F02D 35/026 701/113 |
| 2010/0000487 | A1* | 1/2010 | Hoshino | ............... F02D 35/025 123/179.4 |

FOREIGN PATENT DOCUMENTS

| | | |
|---|---|---|
| EP | 1 582 737 | 10/2005 |
| EP | 1582738 | 10/2005 |
| JP | 2002-364438 | 12/2002 |
| JP | 2005-282426 | 10/2005 |
| JP | 2006-242082 | 9/2006 |
| JP | 2006-283660 | 10/2006 |
| JP | 2007-99017 | 4/2007 |
| JP | 2008 298 031 | 12/2008 |
| WO | WO 2012/032110 | 3/2012 |

* cited by examiner

METHOD AND DEVICE FOR CONTROLLING AN INTERNAL COMBUSTION ENGINE

BACKGROUND OF THE INVENTION

1. Field of the Invention

The present invention relates to a method and device for controlling an internal combustion engine.

2. Description of the Related Art

Particularly in vehicles with start/stop technology, that is, when the engine is frequently switched off and switched on again during normal driving, a comfortable rundown of the internal combustion engine and a rapid restarting of the internal combustion engine are of great importance.

Published Japanese patent application document JP-2008298031 A describes a method in which the throttle valve of the internal combustion engine is closed in the rundown in order to suppress vibrations. That measure reduces the air charge in the cylinders in the internal combustion engine and hence reduces the roughness of the rundown, since compression and decompression are minimized.

For restarting of the internal combustion engine, however, as much air as possible is needed in the cylinders in which ignition takes place for the restart. There is therefore a conflict of objectives between a rapid engine start (which requires a lot of air in the cylinder) and a comfortable, that is, low-vibration, engine rundown (which requires little air in the cylinder). That conflict of objectives is resolved with the present invention.

Devices that alter the lift curve of, in particular, the intake valves of an internal combustion engine and thus regulate the air charge of the cylinders are generally known in the related art. In particular, it is known that the lift curve may be given any desired form over a wide range by electrohydraulic actuators. Internal combustion engines having such electrohydraulic variable valve timing do not require a throttle valve. It is also known that the lift curve of, in particular, the intake valves may be varied by adjustment of the camshaft. Such devices and the throttle valve with which the air charge of the cylinders may be altered are also referred to hereinafter as air-metering devices.

BRIEF SUMMARY OF THE INVENTION

If, with the aid of an air-metering device, the quantity of air supplied to the internal combustion engine is reduced and is increased again only shortly before the internal combustion engine comes to a stop, it is possible to avoid what is referred to as engine shake, that is, the noticeable development of vibrations. This is achieved by virtue of the fact that, in the rundown of the internal combustion, the quantity of air supplied to the internal combustion engine is first reduced and then, when a detected speed of the internal combustion engine has fallen below a speed threshold value, is increased again.

An intake cylinder that is in an intake stroke immediately after or during the increase in the quantity of air supplied is then supplied with an increased quantity of air and it then has an increased air charge. When that intake cylinder then changes to a compression stroke, the increased air charge acts as a gas spring which exerts a strong restoring torque on a crankshaft via the intake cylinder ZYL2. Conversely, the respective air charge in the cylinders that are going into a downward movement exerts on the crankshaft a torque that acts in the direction of the forward rotation of the crankshaft. Since, however, the cylinders that are going into a downward movement have a small air charge, the overall effect on the crankshaft is a restoring torque.

If the speed threshold value is suitably selected, it is possible to ensure that the intake cylinder no longer goes into a power stroke after the increase in the metered quantity of air. This has the advantage that compression of the increased air charge is avoided and this prevents undesirable vibration.

It is especially advantageous if the speed threshold value is selected in such a way that, after the increase in the metered quantity of air, the intake cylinder just stops short of going into the power stroke. If the speed threshold value is selected in that manner and if the speed of the internal combustion engine is greater than the speed threshold value when a request to restart is determined, a method for especially rapid restarting of the internal combustion engine may be implemented.

In order for the speed threshold value to be robustly selected in exactly the way that the intake cylinder just stops short of going into the power stroke after the increase in the metered quantity of air, according to the present invention an adaptation method is proposed. For this it is necessary to define suitable criteria on which the speed threshold value is reduced or increased.

If the speed threshold value is reduced when the intake cylinder still passes through a top dead center after the increase in the metered quantity of air and before the internal combustion engine stops, this ensures in an especially simple manner that, in the further operation of the internal combustion engine, vibrations caused by improperly passing through a top dead center when the air charge is high are prevented.

If the speed threshold value is increased when the intake cylinder no longer goes into a compression stroke after the increase in the metered quantity of air, this ensures in an especially simple manner that, in the further operation of the internal combustion engine, the intake cylinder exhibits an oscillating behavior when stopping.

If the speed threshold value is altered in dependence on a swing-back angle, it is possible to ensure in an especially simple manner that, in the future operation of the internal combustion engine, the intake cylinder exhibits a defined oscillating behavior.

If the speed threshold value is increased when the swing-back angle is greater than a predefinable maximum swing-back angle, this achieves the objective that the intake cylinder particularly robustly just stops short of reaching top dead center.

If the speed threshold value is increased to a predefinable initial threshold value, the adaptation method according to the present invention has defined entry points and is therefore especially robust.

If the initial threshold value is selected to be so great that the intake cylinder reliably passes through top dead center, this means that speed threshold value ns is always adapted coming from values that are too great, which makes the adaptation method especially simple.

If the speed threshold value is increased when the swing-back angle is less than a predefinable minimum swing-back angle, this results in the intake cylinder reliably oscillating on swinging back till the intake stroke.

Monitoring of the speed of the internal combustion engine is carried out most simply at the dead centers. If it is determined at a dead center that the speed has fallen below the speed threshold, then the intake cylinder just goes into the intake stroke. If the quantity of air metered in by the air-metering device is increased while the exhaust valve of the intake cylinder is still open, then an increased quantity of air is pumped from an intake manifold into an exhaust manifold. This results in adverse noise development. If, on the other hand, the quantity of air metered in by the air-metering device is increased too late during the intake stroke of the intake cylinder, then a high pressure difference occurs between intake manifold and cylinder. The inflow of air leads in this case to considerable undesirable noise development. To minimize that noise development, it is advantageous if the quantity of air metered in by the air-metering device is increased immediately after the end of the valve overlap of the intake cylinder, that is, immediately after closing of the exhaust valve.

Since the internal combustion engine is stopped, the injection of fuel is switched off. This is disadvantageous for a rapid restarting of the internal combustion engine, since there is no ignitable mixture in the cylinders. Since, in the case of the method according to invention, air is passed out of the intake manifold into the intake cylinder, it is possible to ensure, with suitable injection before the end of the intake stroke, that an ignitable fuel/air mixture is present in the intake cylinder. Since the intake cylinder comes to a stop near a bottom dead center or in the compression stroke, this is very advantageous for a rapid restart, since a starter has to carry out only a rotation of 180° of the crankshaft before ignition is able to take place in the intake cylinder.

If the fuel is injected before or immediately after the intake cylinder goes into the intake stroke, this is especially beneficial with regard to mixture formation. In the case of intake manifold injection, the metered quantity of fuel may be proportioned especially finely, and in the case of direct injection the early injection of fuel is advantageous for swirling of air and fuel.

DETAILED DESCRIPTION OF THE INVENTION

Figure 1:
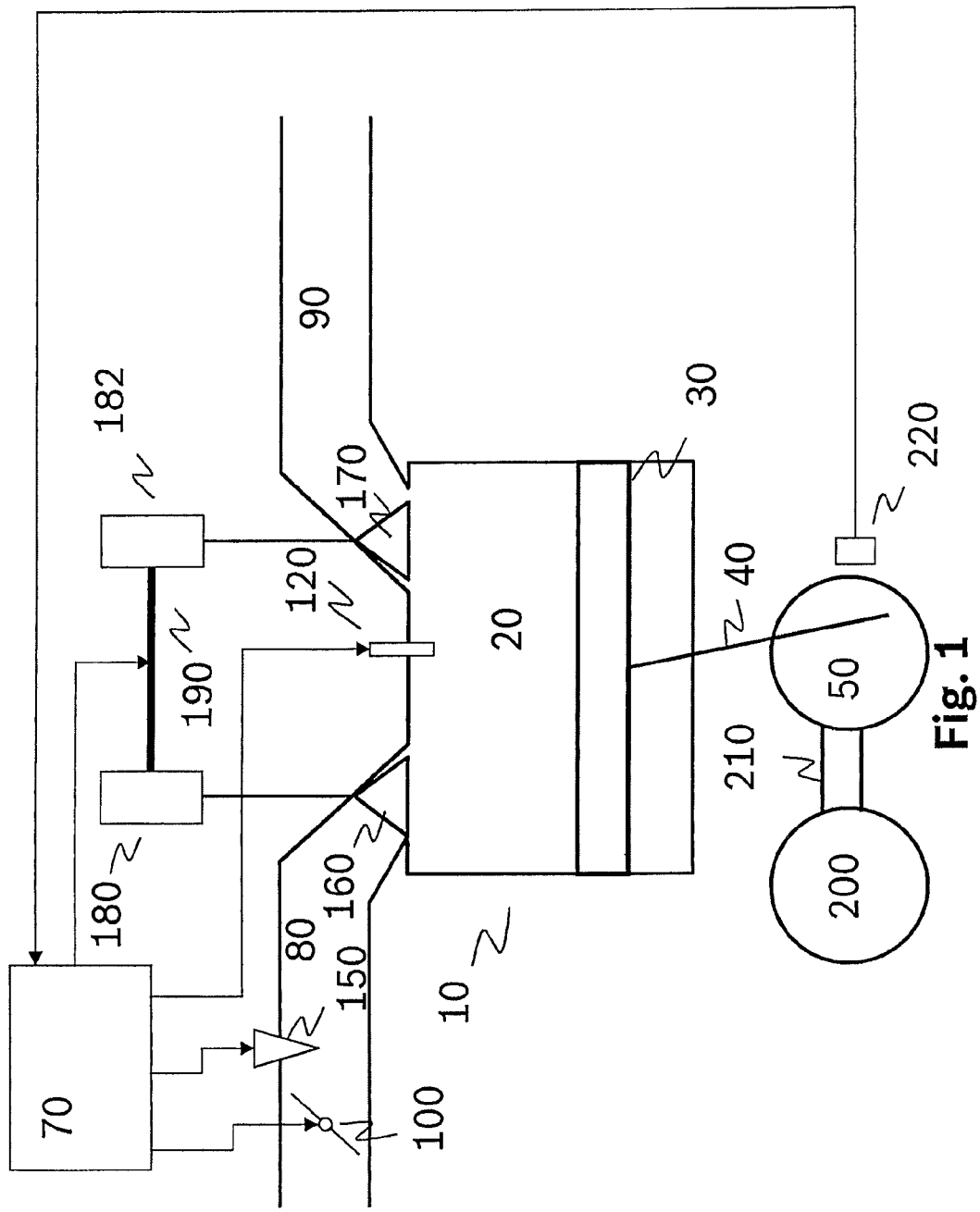
FIG. 1 shows a representation of a cylinder of an internal combustion engine.

FIG. 1 shows a cylinder 10 of an internal combustion engine having a combustion chamber 20 and a piston 30 which is connected to a crankshaft 50 by a connecting rod 40. Piston 30 executes in known manner an upward and downward movement. The reversing points of the movement are referred to as dead centers. The transition from upward movement to downward movement is referred to as top dead center, and the transition from downward movement to upward movement as bottom dead center. An angular position of crankshaft 50, a so-called crankshaft angle, is defined in the conventional manner relative to top dead center. A crankshaft sensor 220 senses the angular position of crankshaft 50.

Air to be combusted is sucked into combustion chamber 20 in known manner via an intake manifold 80 as piston 30 moves downward. This is referred to as the intake stroke. The combusted air is pushed out of combustion chamber 20 via an exhaust manifold 90 as piston 30 moves upward. This is usually referred to as the exhaust stroke. The quantity of air sucked in via intake manifold 80 is set by way of an air-metering device, in the exemplary embodiment a throttle valve 100 whose position is determined by a control unit 70.

Via an intake manifold injection valve 150 disposed in intake manifold 80 fuel is injected into the air sucked in from intake manifold 80, and a fuel/air mixture is produced in combustion chamber 20. The quantity of fuel injected by intake manifold injection valve 150 is determined by control unit 70, usually by way of the duration and/or strength of an actuating signal. A spark plug 120 ignites the fuel/air mixture.

An intake valve 160 at the entry of intake manifold 80 into combustion chamber 20 is driven by a camshaft 190 via cams 180. An exhaust valve 170 at the entry of exhaust manifold 90 into combustion chamber 20 is also driven by camshaft 190 via cams 182. Camshaft 190 is coupled to crankshaft 50. Usually, camshaft 190 makes one revolution per two revolutions of crankshaft 50. Camshaft 190 is so configured that exhaust valve 170 opens in the exhaust stroke and closes near top dead center. Intake valve 160 opens near top dead center and closes in the intake stroke. A phase in which exhaust valve 170 and intake valve of a given technology are open simultaneously is referred to as valve overlap. Such a valve overlap serves, for example, for internal exhaust gas recirculation. Camshaft 190 may, in particular, be configured to be actuable by control unit 70, so that, depending on the operating parameters of the internal combustion engine, different lift curves of intake valve 160 and exhaust valve 170 may be set. Equally, it is also possible, however, for intake valve 160 and exhaust valve 170 to be moved up and down not by camshaft 190, but by electrohydraulic valve actuators. In that case, camshaft 190 and cams 180 and 182 may be omitted. Similarly, throttle valve 100 is not necessary in the case of such electrohydraulic valve actuators.

A starter 200 is mechanically connectable to crankshaft 50 via a mechanical coupling 210. The making of the mechanical connection between starter 200 and crankshaft 50 is also referred to as engaging. The breaking of the mechanical connection between starter 200 and crankshaft 50 is also referred to as releasing. Engaging is possible only when the speed of the internal combustion engine is below a speed threshold value which is dependent on the internal combustion engine and the starter.

Figure 2:
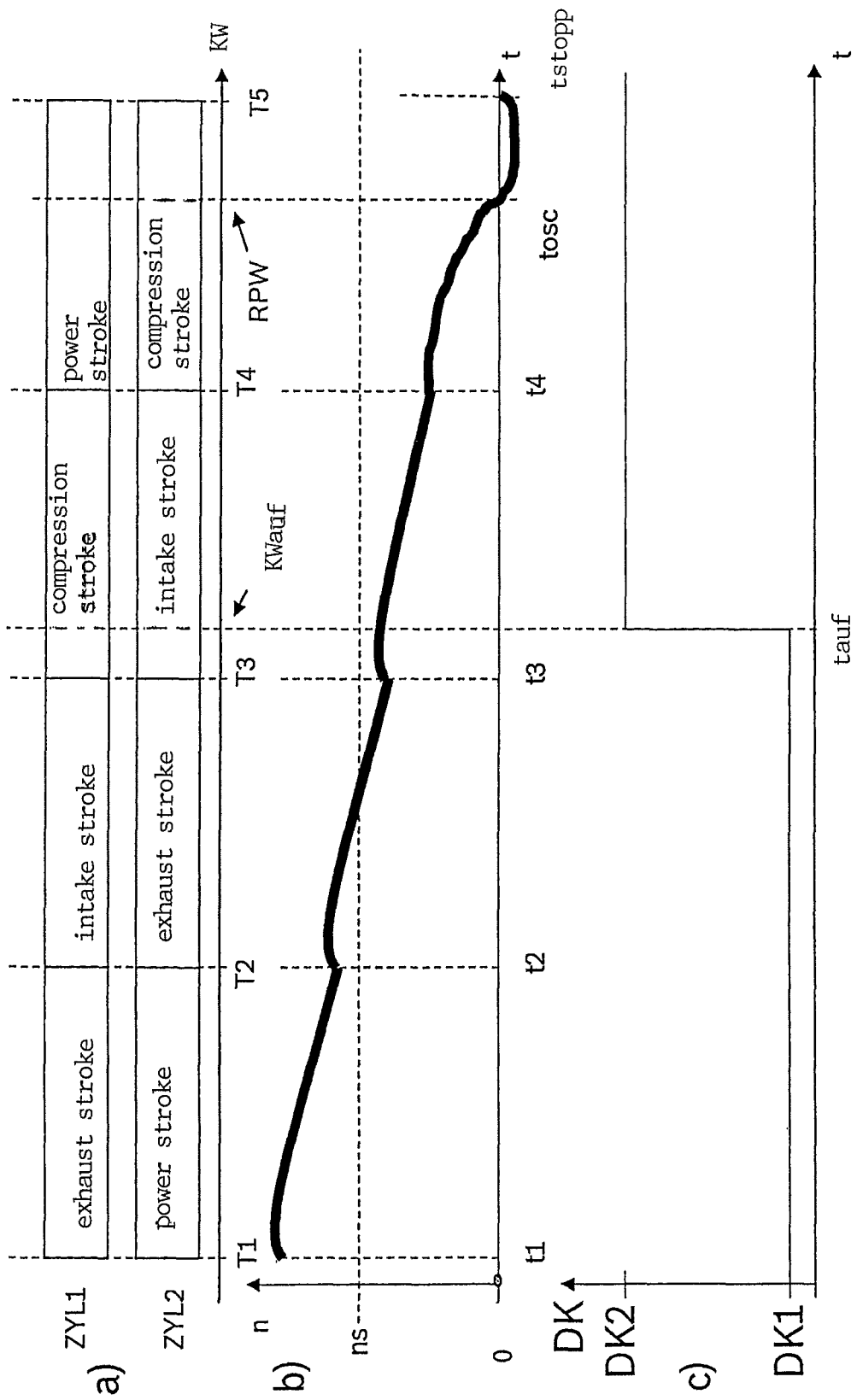
FIG. 2 shows schematically the variation of some characteristics of the internal combustion engine on stopping of the internal combustion engine.

FIG. 2 shows the behavior of the internal combustion engine as the internal combustion engine stops. FIG. 2a shows the sequence of the various strokes of a first cylinder ZYL1 and of a second cylinder ZYL2, plotted over the angle of the crankshaft KW. Entered on the graph are a first dead center T1, a second dead center T2, a third dead center T3, a fourth dead center T4 and a fifth dead center T5 of the internal combustion engine. Between those dead centers, first cylinder ZYL1 runs in known manner through the exhaust stroke, the intake stroke, a compression stroke and a power stroke. In the exemplary embodiment of an internal combustion engine with four cylinders, the strokes of second cylinder ZYL2 are offset by 720°/4=180°. First cylinder ZYL1 is the cylinder that comes immediately before second cylinder ZYL2 in the ignition sequence. In relation to first cylinder ZYL1, first dead center T1, third dead center T3 and fifth dead center T5 are bottom dead centers, and second dead center T2 and fourth dead center T4 are top dead centers. In relation to second cylinder ZYL2, first dead center T1, third dead center T3 and fifth dead center T5 are top dead centers, and second dead center T2 and fourth dead center T4 are bottom dead centers.

FIG. 2b shows, in parallel with the strokes shown in FIG. 2a, the curve of a speed n of the internal combustion engine over time t. Speed n is defined, for example, as the time derivative of crankshaft angle KW. First dead center T1 corresponds to a first time t1, second dead center T2 corresponds to a second time t2, third dead center T3 corresponds to a third time t3, and fourth dead center T4 corresponds to a fourth time t4. Between every two consecutive times, for example between first time t1 and second time t2, the speed initially rises briefly in order then to fall monotonically. The reason for the brief increase in speed is the compression of the air charge in the cylinders. A cylinder that passes through a top dead center compresses its air charge to the maximum extent, with the result that compression energy becomes stored in it. As the internal combustion engine continues to turn, some of that compression energy is converted into rotational energy.

FIG. 2c shows, in parallel with FIG. 2a and FIG. 2b, the time curve of an actuating signal DK of throttle valve 100. As is known from the related art, as the internal combustion engine stops, throttle valve 100 is initially closed, which corresponds to a first actuating signal DK1. If, as shown in FIG. 2b, speed n of the internal combustion engine falls below a speed threshold value ns, for example 300 rev/min, according to the present invention throttle valve 100 is opened at an opening time tauf, which corresponds to a second actuating signal DK2. Opening time tauf is selected in such a way that it occurs shortly after third dead center T3, which is the next dead center after speed n of the internal combustion engine has fallen below speed threshold value ns. Second cylinder ZYL2 goes into the intake stroke at third dead center T3. It is therefore also referred to hereinafter as intake cylinder ZYL2. In the exemplary embodiment, opening time tauf coincides with the end of the valve overlap of the intake cylinder, that is, with the time of closing of exhaust valve 170 of intake cylinder ZYL2. In relation to the top dead center of intake cylinder ZYL2, opening time tauf corresponds to an opening crankshaft angle KWauf. To determine the time at which speed n of the internal combustion engine has fallen below speed threshold value ns, speed n of the internal combustion engine either may be monitored continuously or, since the increase in speed n of the internal combustion engine after the dead centers is small and the opening time tauf is intended to lie shortly after a dead center, it is also possible to examine at every dead center of the internal combustion engine whether speed n of the internal combustion engine has fallen below speed threshold value ns. In the exemplary embodiment illustrated in FIG. 2b, it is recognized at first time t1 and at second time t2 that speed n of the internal combustion engine has not yet fallen below speed threshold ns. At third time t3, it is recognized for the first time that speed n of the internal combustion engine has fallen below speed threshold ns, and throttle valve 100 is opened.

As a result of the opening of throttle valve 100, a great deal of air now flows into the intake cylinder in the intake stroke. When intake cylinder ZYL2 goes into the compression stroke after fourth time t4, the compression work to be done on the air charge, which is greatly increased in comparison with the remaining cylinders, outweighs the compression energy being released in the expanding cylinders, and speed n of the internal combustion engine falls rapidly until it falls to zero at a swing-back time tosc. The rotational motion of crankshaft 50 then reverses, and speed n of the internal combustion engine becomes negative. The swing-back time tosc corresponds to a swing-back angle RPW of crankshaft 50, indicated in FIG. 2a. At a stop time tstopp, the internal combustion engine stops. It is to be noted that the representation of the time axis is nonlinear. As corresponds to the decrease in speed n of the internal combustion engine, the time interval between third time t3 and fourth time t4 is greater than the time interval between second time t2 and third time t3 which in turn is greater than the time interval between first time t1 and second time t2. Fifth dead center T5 of the internal combustion engine is not reached. In the time period between swing-back time tosc and stop time tstopp, crankshaft 50 executes an oscillating motion in which second cylinder ZYL2 oscillates in its compression stroke and its intake stroke, and correspondingly first cylinder ZYL1 oscillates in its power stroke and its compression stroke.

Figure 3:
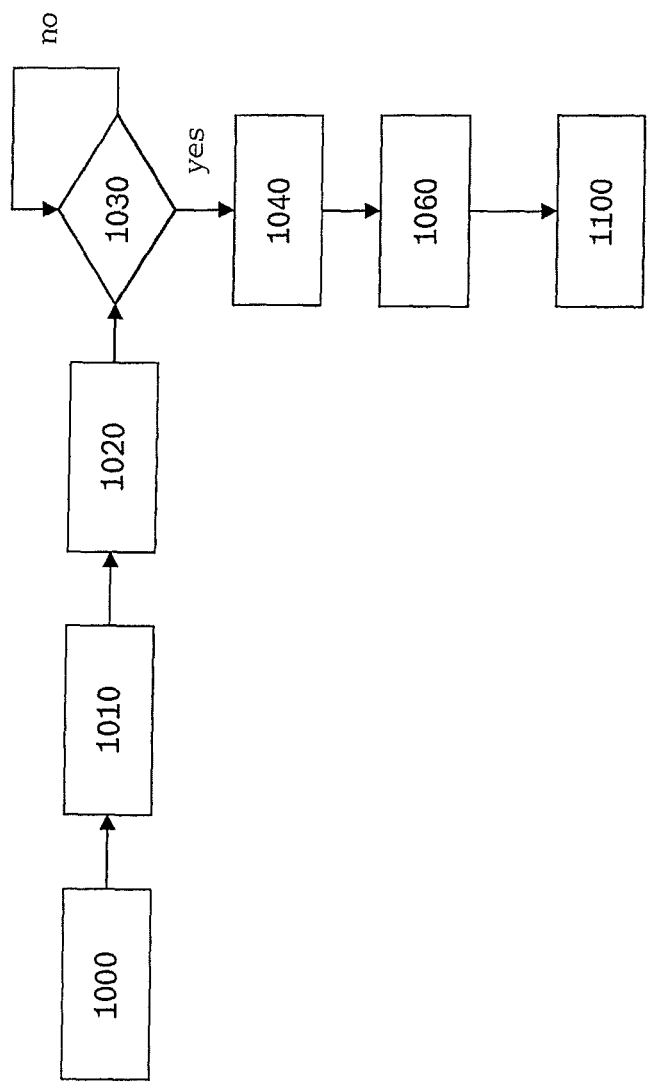
FIG. 3 shows the flow of the method according to the invention for stopping the internal combustion engine.

FIG. 3 shows the flow of the method corresponding to the behavior illustrated in FIG. 2. With the internal combustion engine running, it is determined in a stop detection step 1000 that the internal combustion engine should be switched off. This is followed by step 1010 in which injection and ignition are switched off. The internal combustion engine is therefore running down. Then, step 1020 follows, in which the throttle valve is closed. In the case of internal combustion engines with variable camshaft timing, in step 1020 it is alternatively possible for a switch to be made to a smaller cam, so that the air charge in the cylinders is reduced. In the case of internal combustion engines with electrohydraulic variable valve timing, in step 1020 the valves of the internal combustion engine may be closed. Step 1030 follows, which examines whether speed n of the internal combustion engine has fallen below speed threshold value ns. If that is the case, step 1040 follows. If that is not the case, step 1030 is repeated until speed n of the internal combustion engine has fallen below speed threshold value ns. In step 1040, throttle valve 100 is opened at opening time tauf. In the case of internal combustion engines with variable camshaft timing, it is possible instead to switch, for example, to a larger cam in step 1040, so that the air charge in intake cylinder ZYL2 increases. In the case of internal combustion engines with electrohydraulic variable valve timing, in step 1040 intake valve 160 of intake cylinder ZYL2 may be actuated in such a way that it is open during the intake stroke of intake cylinder ZYL2 and therefore the air charge in intake cylinder ZYL2 is increased. Step 1060 follows. In optional step 1060, fuel is injected into intake manifold 80 of the internal combustion engine via intake manifold injection valve 150. That injection of fuel is performed in such a way that a fuel/air mixture is sucked into intake cylinder ZYL2 in the intake stroke. The method according to the present invention ends in step 1100. As illustrated in FIG. 2b, the internal combustion engine oscillates into a stop position in which intake cylinder ZYL2 comes to a stop in the intake stroke or in the compression stroke. The injection of fuel in step 1060 is advantageous for an internal combustion engine with intake manifold injection for a rapid restarting of the internal combustion engine.

Figure 4:
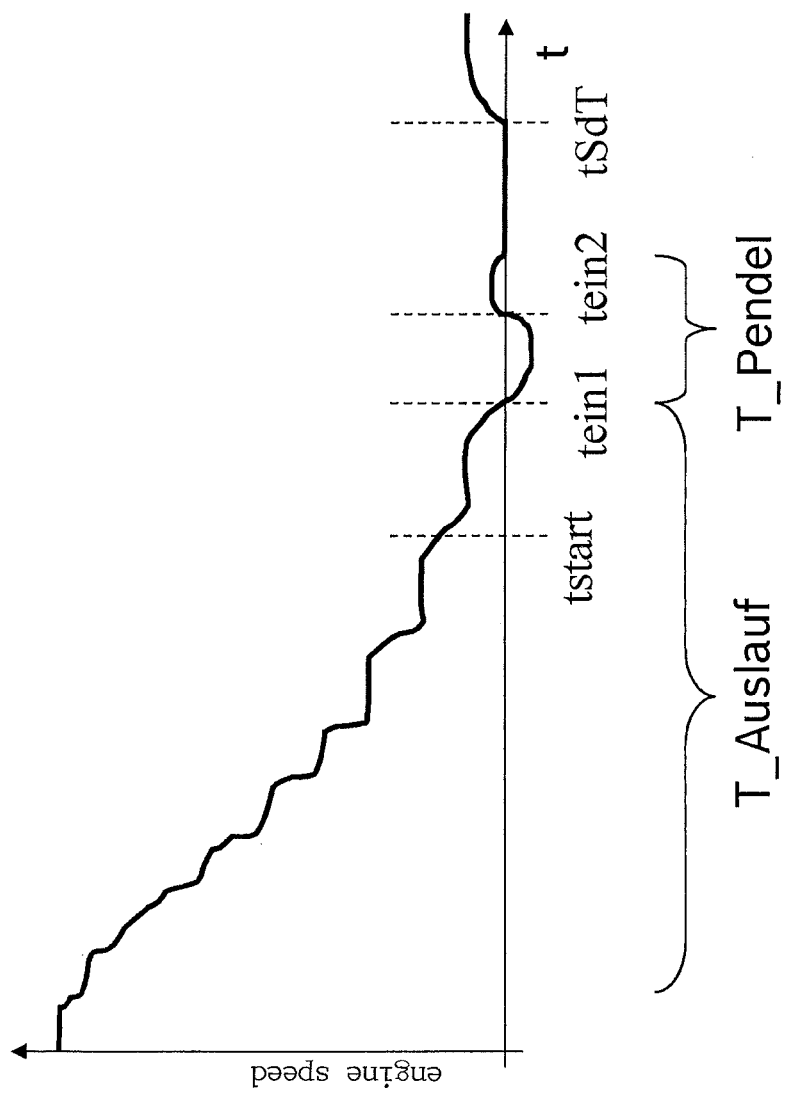
FIG. 4 shows a speed curve on stopping and restarting of the internal combustion engine.

FIG. 4 shows the time curve of speed n of the internal combustion engine when stopping and restarting. Speed n of the internal combustion engine falls during a rundown phase T_Auslauf in the manner illustrated in FIG. 2b, and finally changes sign when the rotational motion of the internal combustion engine reverses at swing-back time tosc illustrated in FIG. 2b. This is shown in FIG. 4 as the end of rundown phase T_Auslauf and the beginning of an oscillation phase T_Pendel. While the internal combustion engine is still in rundown phase T_Auslauf, it is ascertained at a start command time tstart that the internal combustion engine should be restarted, for example because it has been detected that a driver has depressed an accelerator pedal. Such a start request ascertained before stop time tstopp is also referred to as a "change of mind". In oscillation phase T_Pendel, the curve of speed n of the internal combustion engine follows a resulting course until it falls to and stays at constant zero at stop time tstopp illustrated in FIG. 2b. Stop time tstopp marks in FIG. 4 the end of oscillation phase T_Pendel.

In the case of the method known from the related art for restarting of the internal combustion engine, following oscillation phase T_Pendel it is recognized that the internal combustion engine is at a standstill, starter 200 is engaged, and the starter is actuated. After an actuation lag time T_tot, not shown in FIG. 4, of starter 200 of, for example, 50 ms, starter 200 begins rotational motion at a time tSdT and thus sets crankshaft 50 in motion again. In contrast, in the case of the method according to the present invention a first engagement time tein1 and, where applicable, a second engagement time tein2 are determined. First engagement time tein1 and second engagement time tein2 are characterized in that speed n of the internal combustion engine is so low that it is possible to engage starter 200. First engagement time tein1 and second engagement time tein2 are determined by control unit 70. If the time interval between start command time tstart and first engagement time tein1 is greater than actuation lag time T_tot, starter 200 is engaged and actuated in such a way that it begins rotational motion at first engagement time tein1. If first engagement time tein1 is too close in time to start command time tstart, starter 200 is engaged and actuated in such a way that it begins rotational motion at second engagement time tein2.

Figure 5:
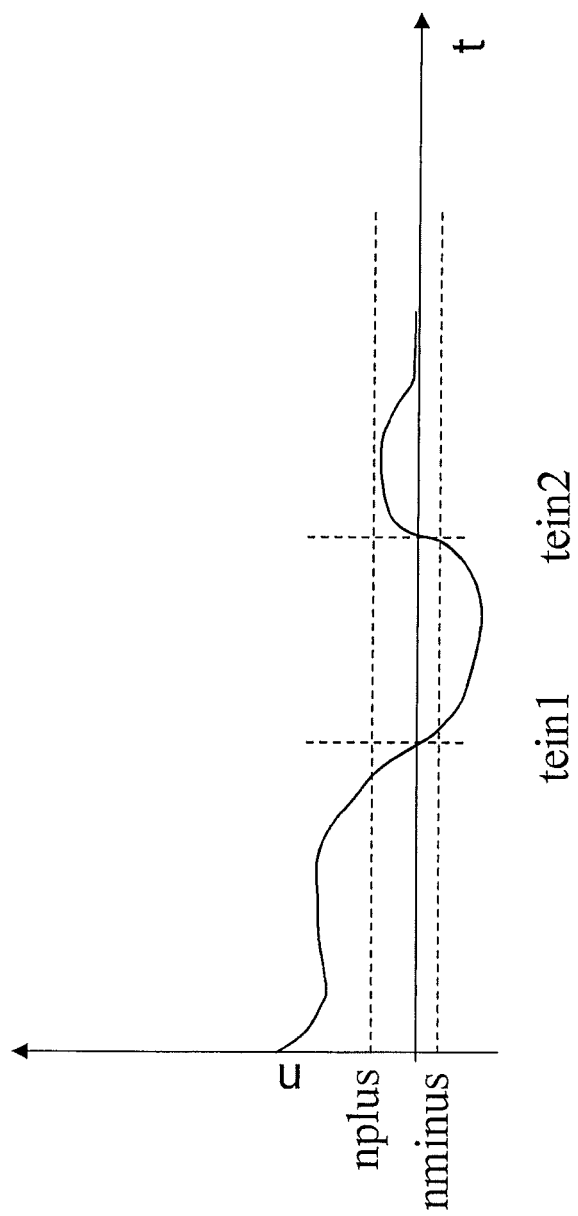
FIG. 5 shows the speed curve on stopping and restarting of the internal combustion engine in detail.

FIG. 5 illustrates in detail the selection of first engagement time tein1 and second engagement time tein2. As described, after opening time tauf, speed n of the internal combustion engine rapidly falls to zero, and the internal combustion engine begins backward motion at swing-back time t_osc. First engagement time tein1 is determined after the opening of throttle valve 100, for example on the basis of engine operating maps or on the basis of models stored in control unit 70, and corresponds to estimated swing-back time tosc. It will be appreciated that, instead of swing-back time tosc, other times at which speed n of the internal combustion engine has a zero crossing may be predicted and selected as first engagement time tein1.

In addition to the zero crossing of speed n of the internal combustion engine, a second engagement time tein2 may be selected from which time onward it is ensured that speed n of the internal combustion engine no longer departs from a speed band in which engagement of starter 200 is possible. That speed band is given, for example, by a positive threshold nplus, for example 70 rev/min, as far as which starter 200 may be engaged during forward rotation of the internal combustion engine, and by a negative threshold nminus, for example 30 rev/min, as far as which starter 200 may be engaged during backward rotation of the internal combustion engine. Control unit 70 calculates, for example on the basis of engine operating maps, that the kinetic energy of the internal combustion engine has fallen from second engagement time tein2 to such an extent that there is no longer any departure from the speed band (nminus, nplus). At second engagement time tein2 or at any time after second engagement time tein2, it is possible for starter 200 to be engaged and set into rotational motion.

Figure 6:
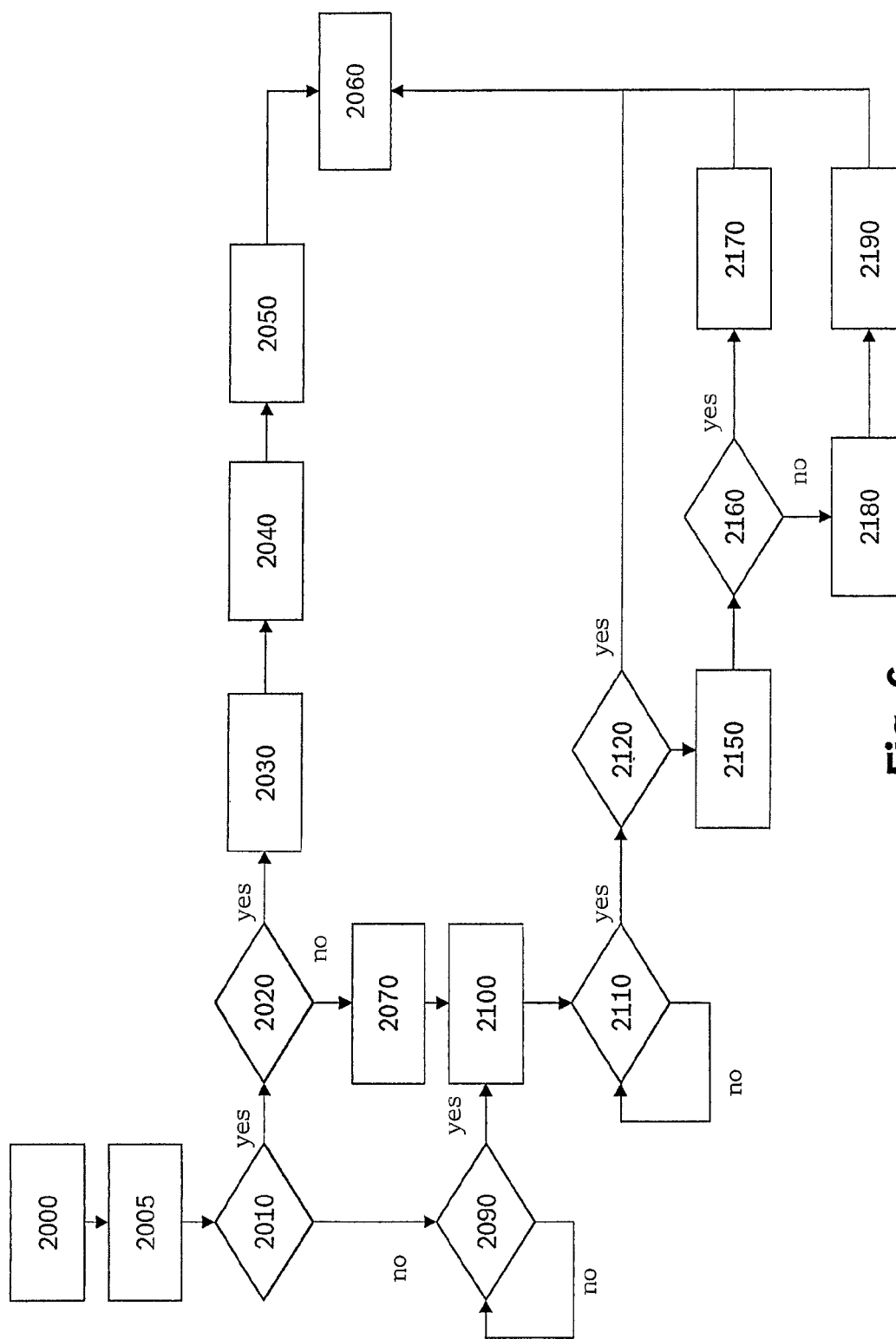
FIG. 6 shows the flow of the method according to the invention on restarting of the internal combustion engine.

FIG. 6 shows the flow of the method according to the present invention for restarting of the internal combustion engine. Step 2000 coincides with step 1000 shown in FIG. 3. In that step, a request to stop the internal combustion engine is ascertained. This is followed by step 2005. In step 2005, the throttle valve is closed or other measures are taken, for example adjustment of cams 180, 182 or a suitable electrohydraulic actuation of valves 160 and 170, in order to reduce the air charge in the cylinders. This is followed by step 2010.

In step 2010, it is determined whether a start request for starting of the internal combustion engine is determined while the internal combustion engine is still running down, that is, during rundown phase T_Auslauf illustrated in FIG. 4. If that is the case, step 2020 follows. If that is not the case, step 2090 follows. Step 2020 examines whether speed n of the internal combustion engine is above speed threshold value ns (where applicable by a minimum difference, for example 10 revolutions per minute). Those checks may take place continuously or alternatively in synchrony with the crankshaft, in particular at each dead center of the internal combustion engine. If speed n of the internal combustion engine is above speed threshold value ns, then step 2030 follows, if not step 2070 follows.

In step 2030, the throttle valve is opened or other measures are taken, for example adjustment of cams 180, 182 or a suitable electrohydraulic actuation of valves 160 and 170, in order to increase the air charge in the cylinder that is the next to be in the intake stroke. Fuel is injected into intake manifold 80 via the intake manifold injection valve. This is followed by step 2040 in which intake cylinder ZYL2 is determined, that is, the cylinder whose air charge is to be considerably increased as the next to be in the intake stroke. Intake cylinder ZYL2 goes into the intake stroke and sucks in the fuel/air mixture situated in intake manifold 80. Intake cylinder ZYL2 then changes to the compression stroke. Speed n is greater than speed threshold value ns. Speed threshold value ns is selected in such a way that intake cylinder ZYL2 just stops short of passing through a top dead center. At speed n of the internal combustion engine it is therefore ensured that intake cylinder ZYL2 passes through a top dead center again and changes to the power stroke. Step 2050 follows. In step 2050, the fuel/air mixture in intake cylinder ZYL2 is ignited, which accelerates the rotation of crankshaft 50, and step 2060 follows. In step 2060, further measures are carried out to bring about starting of the internal combustion engine, in particular a fuel/air mixture is correspondingly ignited in the remaining cylinders of the internal combustion engine. When the internal combustion engine starts, the method according to the invention comes to an end.

In step 2070, fuel is injected into intake manifold 80 via intake manifold injection valve 150. This is followed by step 2100.

In step 2090, as corresponds to step 1030 shown in FIG. 3, it is examined whether speed n of the internal combustion engine has fallen below speed threshold value ns. If that is not the case, the method branches back to step 2010. If that is the case, step 2100 follows.

Step 2100 corresponds to step 1040 of FIG. 3. The throttle valve is opened or another air-metering device, for example a cam timing control or an electrohydraulic valve control, is actuated in such a way that the quantity of air supplied is increased. This is followed by step 2110.

In step 2110, it is ascertained whether there is a request for starting of the internal combustion engine. If that is the case, step 2120 follows. If that is not the case, step 2110 is repeated until there is a request for starting of the internal combustion engine. Step 2120 examines whether the internal combustion engine is at a standstill. This corresponds to the time period shown in FIG. 4 after the end of oscillation phase T_Phase. If that is the case, step 2060 follows, in which conventional measures for starting of the internal combustion engine are carried out. As shown in FIG. 4, the internal combustion engine is started at a time tSdT.

If the internal combustion engine is not at a standstill in step 2120, step 2150 follows. In step 2150, first engagement time tein1 is predicted. That prediction is made, for example, on the basis of an engine operating map. On the basis of speed n that was determined when intake cylinder ZYL2 last passed through a top dead center (in the exemplary embodiment at fourth time t4) it is possible to ascertain the kinetic energy of the internal combustion engine, and from second position DK2 of the air-metering device it is possible to estimate the air charge of intake cylinder ZYL2, and hence the strength of the gas spring compressed by intake cylinder ZYL2 in the compression stroke. From this it is possible to estimate swing-back time tosc, which is predicted as first engagement time tein1. This is followed by step 2160, which examines whether the time difference between first engagement time tein1 and the current time is greater than actuation lag time T_tot of starter 200. If that is the case, step 2170 follows. If that is not the case, step 2180 follows.

In step 2180, second engagement time tein2 is ascertained. As explained with reference to FIG. 5, second engagement time tein2 is selected in such a way that, from second engagement time tein2 onward, speed n of the internal combustion engine remains in the speed interval between negative threshold nminus and positive threshold nplus. In step 2190 which follows, starter 200 is engaged and, from second engagement time tein2, is started. This is followed by step 2060, in which the further measures for starting of the internal combustion engine are carried out. Alternatively, it is also possible to determine in step 2180 an engagement interval during which speed n remains between negative threshold nminus and positive threshold nplus. In step 2190, in that case starter 200 is engaged and started in the engagement interval.

Instead of an intake manifold injection valve 150, it is also conceivable for the injection valve of the internal combustion engine to be disposed in the combustion chamber, that is, to be configured as a direct-injection valve. In that case, the injection of fuel into the intake manifold immediately following the opening of the throttle valve may be dispensed with. It is important only that fuel is suitably injected into intake cylinder ZYL2 before it is ignited on restarting.

Figure 7:
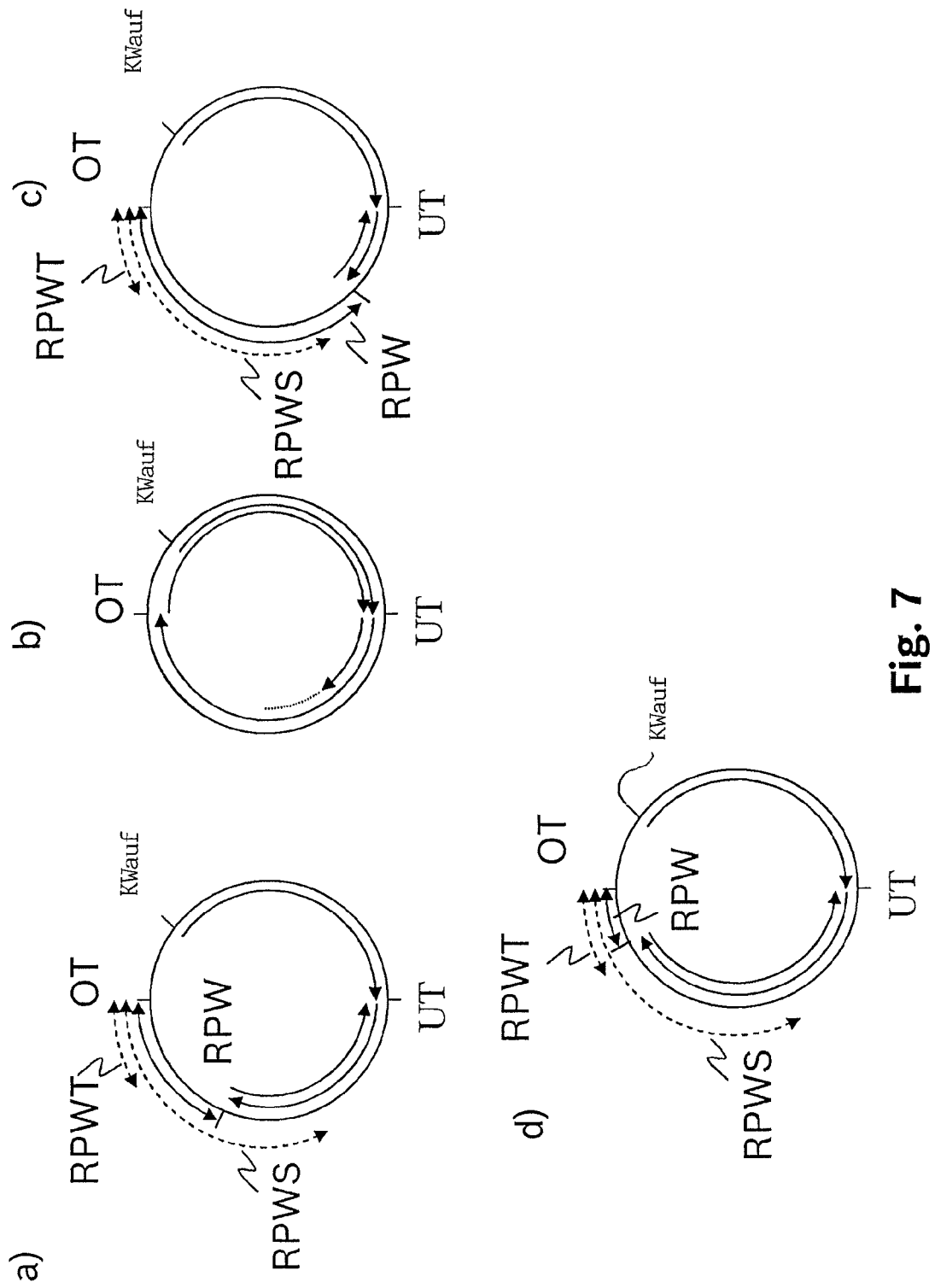
FIG. 7 shows schematically an oscillation behavior of the internal combustion engine as it oscillates to a stop, at various speed threshold values.

FIG. 7 illustrates the selection of speed threshold value ns. FIG. 7a illustrates the oscillating behavior of intake cylinder ZYL2 when speed threshold value ns is selected correctly. At opening crankshaft angle KWauf, intake cylinder ZYL2 is in forward motion, passes through bottom dead center UT corresponding to fourth dead center T4, and reverses its direction of rotation at swing-back angle RPW. The swing-back angle is greater than the predefinable minimum swing-back angle RPWT and smaller than the predefinable maximum swing-back angle RPWS. The further oscillating motion of intake cylinder ZYL2 until coming to a stop is merely suggested in FIG. 7a.

FIG. 7b illustrates the oscillating behavior of intake cylinder ZYL2 when speed threshold value ns selected is too high. Too high a speed threshold value ns means that the kinetic energy of the internal combustion engine on opening of throttle valve 100, that is, at opening crankshaft angle KWauf, is too high. This results in intake cylinder ZYL2 passing through bottom dead center UT corresponding to fourth dead center T4 and then also through top dead center OT corresponding to fifth dead center T5. This results in undesirable vibration in the drive train and is found uncomfortable by the driver.

FIG. 7c illustrates the oscillating behavior of intake cylinder ZYL2 when speed threshold value ns selected is too low. Too low a speed threshold value ns means that the kinetic energy of the internal combustion engine on opening of throttle valve 100, that is, at opening crankshaft angle KWauf, is too low. Intake cylinder ZYL2 passes through bottom dead center UT corresponding to the fourth dead center, but has a relatively large swing-back angle RPW which is greater than the predefinable maximum swing-back angle RPWS.

If it is ascertained in step 3020 that speed n of the internal combustion engine is greater than speed threshold value ns, it may no longer be reliably assumed that intake cylinder ZYL2 rotates over top dead center OT and that the internal combustion engine is therefore capable of being started quickly.

FIG. 7d illustrates the oscillating behavior of intake cylinder ZYL2 when speed threshold value ns is slightly too high. Analogously to the case illustrated in FIG. 7b, this means that the kinetic energy of the internal combustion engine on opening of throttle valve 100, that is, at opening crankshaft angle KWauf, is too high. Unlike the case illustrated in FIG. 7b, however, the kinetic rotational energy of the internal combustion engine is not so great that intake cylinder ZYL2 rotates over top dead center OT. Its swing-back angle RPW is, however, relatively small, and is smaller than predefinable minimum swing-back angle RPWT.

The selection of speed threshold value ns is therefore of central importance to the functioning of the method of the present invention, but on the other hand it is very difficult, since it depends on quantities that vary during the lifetime of the internal combustion engine, such as, for example, the coefficient of friction of the engine oil used.

Figure 8:
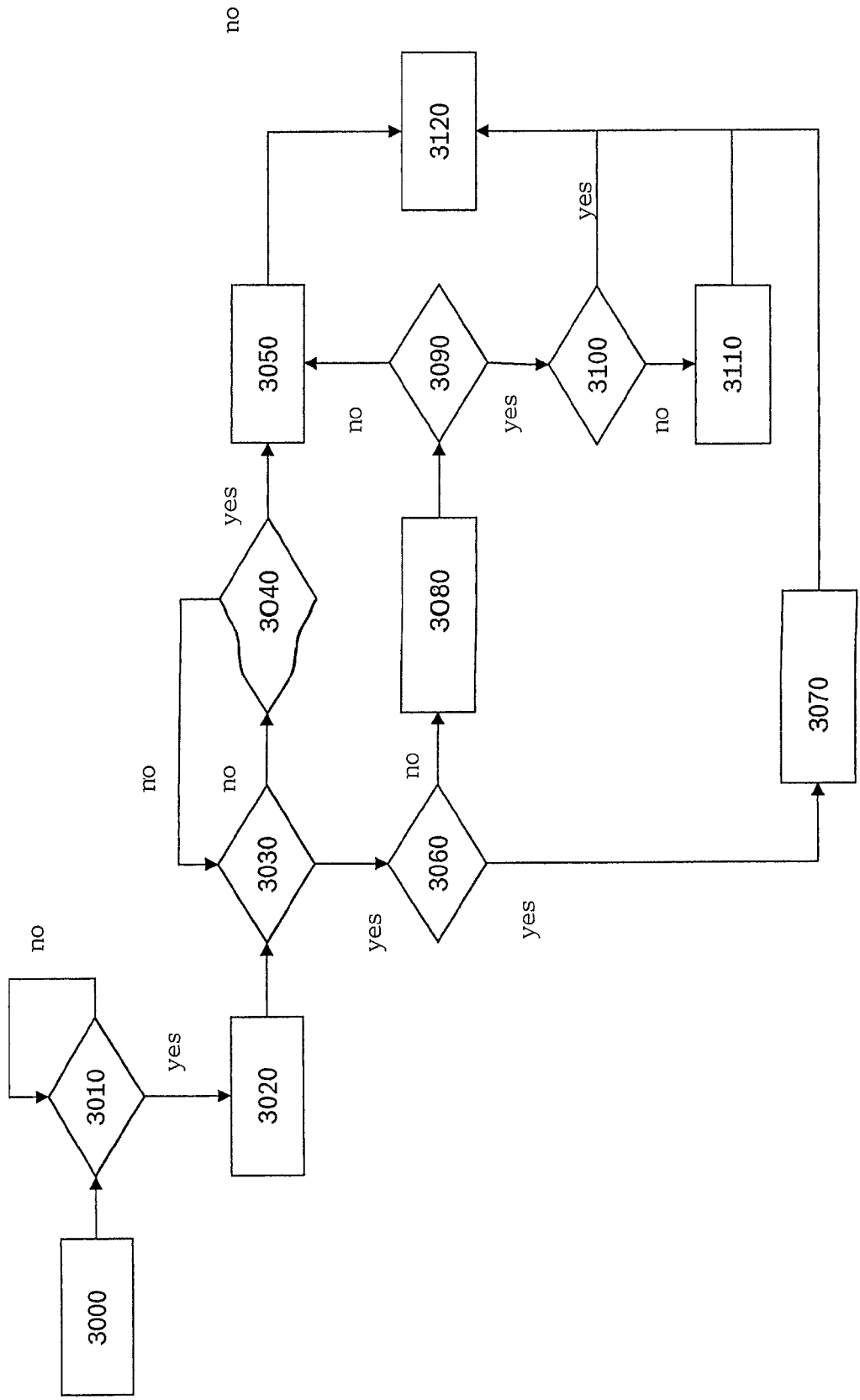
FIG. 8 shows the flow of the method according to the invention to determine the speed threshold value.

FIG. 8 describes an adaptation method with which an initially predefined speed threshold value ns may be adapted in order to compensate for errors in the initialization or for changes in the characteristics of the internal combustion engine. In step 3000, it is ascertained that there is a stop request for the internal combustion engine, and measures for starting of the internal combustion engine are initiated. In step 3010, as corresponds to step 1030, it is examined whether speed n of the internal combustion engine has fallen below speed threshold value ns. If that is the case, step 3020 follows, in which, as corresponds to step 1040, the throttle valve is opened. This is followed by step 3030, in which it is examined whether intake cylinder ZYL2 has already passed through bottom dead center UT. If that is not the case, step 3040 follows. If that is the case, step 3060 follows.

Step 3040 intercepts the case where speed threshold value ns selected is so low and the internal combustion engine comes to a stop even before intake cylinder ZYL2 passes through bottom dead center UT. For that purpose, step 3040 examines whether the internal combustion engine is at a standstill. If that is not the case, the method branches back to step 3030. If the internal combustion engine is at a standstill, step 3050 follows. In step 3050, speed threshold value ns is increased. This is followed by step 3120, with which the method ends.

In step 3060, the rotational motion of the internal combustion engine is monitored. If the internal combustion engine continues to turn intake cylinder ZYL2 over top dead center OT, step 3070 follows. If top dead center OT is not reached, step 3080 follows. In step 3070, the behavior illustrated in FIG. 7*b* is operative, and speed threshold value ns is reduced. This is followed by step 3120, with which the method ends.

In step 3080, swing-back angle RPW is determined, for example with the aid of crankshaft sensor 220. This is followed by step 3090. Step 3090 examines whether swing-back angle RPW is smaller than maximum swing-back angle RPWS which, for example, lies 80° after UT (in the normal direction of rotation of the internal combustion engine), that is to say, is 100°. If swing-back angle RPW is smaller than maximum swing-back angle RPWS, then either the correct behavior shown in FIG. 7*a* or the incorrect behavior shown in FIG. 7*d* is operative. In that case, step 3100 follows. If swing-back angle RPW is greater than maximum swing-back angle RPWS, the behavior illustrated in FIG. 7*c* is operative and step 3050 follows, in which speed threshold value ns is increased.

Step 3100 examines whether swing-back angle RPW is greater than minimum swing-back angle RPWT. Minimum swing-back angle RPWT is advantageously selected to be so great that exhaust valve 170 of first cylinder ZYL1 is not yet open. Otherwise, air is able to flow out of exhaust manifold 90 into first cylinder ZYL1, which has a negative effect on the oscillating behavior of the internal combustion engine as it oscillates to a stop. Exhaust valve 170 of first cylinder ZYL1 opens, for example, at a crankshaft angle of 156° after top dead center OT. In a four-cylinder internal combustion engine, the strokes of first cylinder ZYL1 and second cylinder ZYL2 are offset by 180°, so that exhaust valve 170 of first cylinder ZYL1 opens 24° before top dead center OT of second cylinder ZYL2. Minimum swing-back angle RPWT should therefore be selected to be greater than 24°, for example should be 30°. In the case of an internal combustion engine with a number of cylinders other than four, a minimum swing-back angle RPWT selected differently may be advantageous. For example, in the case of a six-cylinder internal combustion engine, the strokes of first cylinder ZYL1 and second cylinder ZYL2 are offset by 120°. For that reason, the minimum swing-back angle RPWT should in that case be advantageously selected to be greater than 84°, for example to be 90°.

If swing-back angle RPW is greater than minimum swing-back angle RPWT, then the correct behavior shown in FIG. 7*a* is operative and step 3120 follows, with which the method ends. If swing-back angle RPW is smaller than the minimum swing-back angle, then the behavior illustrated in FIG. 7*d* is operative and step 3110 follows, in which speed threshold value ns is reduced. Step 3110 is followed by step 3120, with which the method ends.

The increasing of speed threshold value ns in step 3050 either may be done incrementally or speed threshold value ns is increased to an initial threshold value nsi at which it is ensured that the internal combustion engine exhibits the behavior illustrated in FIG. 7*b*, that is to say, speed threshold value ns is initially selected to be too high. Initial threshold value nsi may, for example, be in the form of an applicable threshold. It is selected in such a way that, within the framework of the operating parameters that are possible during operation of the internal combustion engine, for example different leakages of air charge, different engine oils or different production spreads of the friction of the internal combustion engine, the internal combustion engine exhibits the behavior illustrated in FIG. 7*b*, that is, intake cylinder ZYL2 goes into the power stroke.

The reduction of speed threshold value ns in step 3110 may, for example, be carried out incrementally.

The adaptation of speed threshold value ns may optionally also be carried out when the restarting of the internal combustion engine has not proceeded properly: speed threshold value ns is increased if it has been decided in step 2020 that ascertained speed n of the internal combustion engine is greater than speed threshold value ns and, after performing steps 2030, 2040 and 2050, it is found in step 2060 that intake cylinder ZYL2 has not gone into the power stroke.

What is claimed is:

1. A method for controlling an internal combustion engine, comprising:
   reducing a quantity of air supplied to the internal combustion engine via an air-metering device after a stop request for stopping the engine has been detected; and
   subsequently increasing the quantity of air supplied to the internal combustion engine via the air-metering device when a detected speed of the internal combustion engine falls below a predefined speed threshold value;
   wherein the predefined speed threshold value is increased when, after the metered quantity of air is increased up to stopping of the internal combustion engine, an intake cylinder no longer passes through a bottom dead center, wherein the intake cylinder is a cylinder of the internal combustion engine that is in an intake stroke one of immediately after or during the increase of the quantity of air supplied to the internal combustion engine; and
   wherein the speed threshold value is reduced when, after the metered quantity of air is increased up to stopping of the internal combustion engine, the intake cylinder goes into a power stroke.

2. The method as recited in claim 1, wherein the quantity of air metered in by the air-metering device is increased immediately after closing of an exhaust valve of the intake cylinder.

3. The method as recited in claim 1, wherein fuel is injected to provide an ignitable fuel/air mixture in the intake cylinder when the intake cylinder goes out of the intake stroke.

4. The method as recited in claim 1, wherein fuel is injected one of before or immediately after the intake cylinder goes into the intake stroke.

5. The method as recited in claim 1, wherein the predefined speed threshold value is altered in dependence on a swing-back angle.

6. The method as recited in claim 5, wherein the predefined speed threshold value is increased when the swing-back angle is greater than a predefined maximum swing-back angle.

7. The method as recited in claim 6, wherein the predefined speed threshold value is increased to a predefined initial threshold value.

8. The method as recited in claim 7, wherein the initial speed threshold value is selected to ensure that the intake cylinder passes through top dead center.

9. The method as recited in claim 5, wherein the speed threshold value is lowered when the swing-back angle is smaller than a predefined minimum swing-back angle.

10. A non-transitory computer-readable data storage medium storing a computer program having program codes which, when executed on a computer, performs a method for controlling an internal combustion engine, the method comprising:
  reducing a quantity of air supplied to the internal combustion engine via an air-metering device after a stop request for stopping the engine has been detected; and
  subsequently increasing the quantity of air supplied to the internal combustion engine via the air-metering device when a detected speed of the internal combustion engine falls below a predefined speed threshold value;
  wherein the predefined speed threshold value is increased when, after the metered quantity of air is increased up to stopping of the internal combustion engine, an intake cylinder no longer passes through a bottom dead center, wherein the intake cylinder is a cylinder of the internal combustion engine that is in an intake stroke one of immediately after or during the increase of the quantity of air supplied to the internal combustion engine; and
  wherein the speed threshold value is reduced when, after the metered quantity of air is increased up to stopping of the internal combustion engine, the intake cylinder goes into a power stroke.

11. A control device configured to perform at least one of an open-loop and closed-loop control of an internal combustion engine, comprising:
  means for reducing a quantity of air supplied to the internal combustion engine via an air-metering device after a stop request for stopping the engine has been detected;
  means for subsequently increasing the quantity of air supplied to the internal combustion engine via the air-metering device when a detected speed of the internal combustion engine falls below a predefined speed threshold value; and
  means for adjusting the predefined speed threshold value;
  wherein the predefined speed threshold value is increased when, after the metered quantity of air is increased up to stopping of the internal combustion engine, an intake cylinder no longer passes through a bottom dead center, wherein the intake cylinder is a cylinder of the internal combustion engine that is in an intake stroke one of immediately after or during the increase of the quantity of air supplied to the internal combustion engine; and
  wherein the speed threshold value is reduced when, after the metered quantity of air is increased up to stopping of the internal combustion engine, the intake cylinder goes into a power stroke.

* * * * *